(12) United States Patent
Noto

(10) Patent No.: US 10,928,949 B2
(45) Date of Patent: *Feb. 23, 2021

(54) DISPLAY CONTROL AND TOUCH DETECTION DEVICE, SEMICONDUCTOR INTEGRATED CIRCUIT

(71) Applicant: Synaptics Japan GK, Tokyo (JP)

(72) Inventor: Takayuki Noto, Tokyo (JP)

(73) Assignee: Synaptics Japan GK, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/426,971

(22) Filed: May 30, 2019

(65) Prior Publication Data

US 2019/0278423 A1 Sep. 12, 2019

Related U.S. Application Data

(63) Continuation of application No. 15/434,754, filed on Feb. 16, 2017, now Pat. No. 10,318,052.

(30) Foreign Application Priority Data

Mar. 15, 2016 (JP) .................................. 2016-050709

(51) Int. Cl.
| | |
|---|---|
| G06F 3/041 | (2006.01) |
| G06F 3/044 | (2006.01) |
| G02F 1/1333 | (2006.01) |
| G09G 3/36 | (2006.01) |

(52) U.S. Cl.
CPC ........ *G06F 3/0416* (2013.01); *G02F 1/13338* (2013.01); *G06F 3/044* (2013.01); *G06F 3/0412* (2013.01); *G09G 3/3648* (2013.01); *G09G 2354/00* (2013.01)

(58) Field of Classification Search
None
See application file for complete search history.

(56) References Cited

U.S. PATENT DOCUMENTS

| | | |
|---|---|---|
| 2007/0257890 A1 | 11/2007 | Hotelling et al. |
| 2014/0160067 A1 | 6/2014 | Kim et al. |
| 2014/0210775 A1 | 7/2014 | Ota et al. |
| 2017/0010739 A1 | 1/2017 | Ito et al. |

FOREIGN PATENT DOCUMENTS

| | | |
|---|---|---|
| JP | 2006301655 A | 11/2006 |
| JP | 2012234475 A | 11/2012 |
| JP | 2013097469 A | 5/2013 |
| JP | 2014146093 A | 8/2014 |

*Primary Examiner* — Joseph R Haley
(74) *Attorney, Agent, or Firm* — Leydig, Voit & Mayer, Ltd.

(57) ABSTRACT

A display control and touch detection device is capable of controlling display and non-display terms in start timing depending on a result of touch detection, and includes a nonvolatile memory and a control logic which selectively uses data stored in the memory according to a display mode. The control logic changes the display and non-display terms in start timing in display frame periods, whereby the phenomenon of appearance of an undesired brightness difference at a fixed location in a display frame with no display, and the phenomenon of occurrence of flicker owing to the undesired brightness difference can be suppressed. Based on the result of touch detection, the control logic changes the way to use data which decide start timings of display and no display. The start timings of display and non-display terms in a display frame period can be changed depending on the result of touch detection readily.

20 Claims, 11 Drawing Sheets

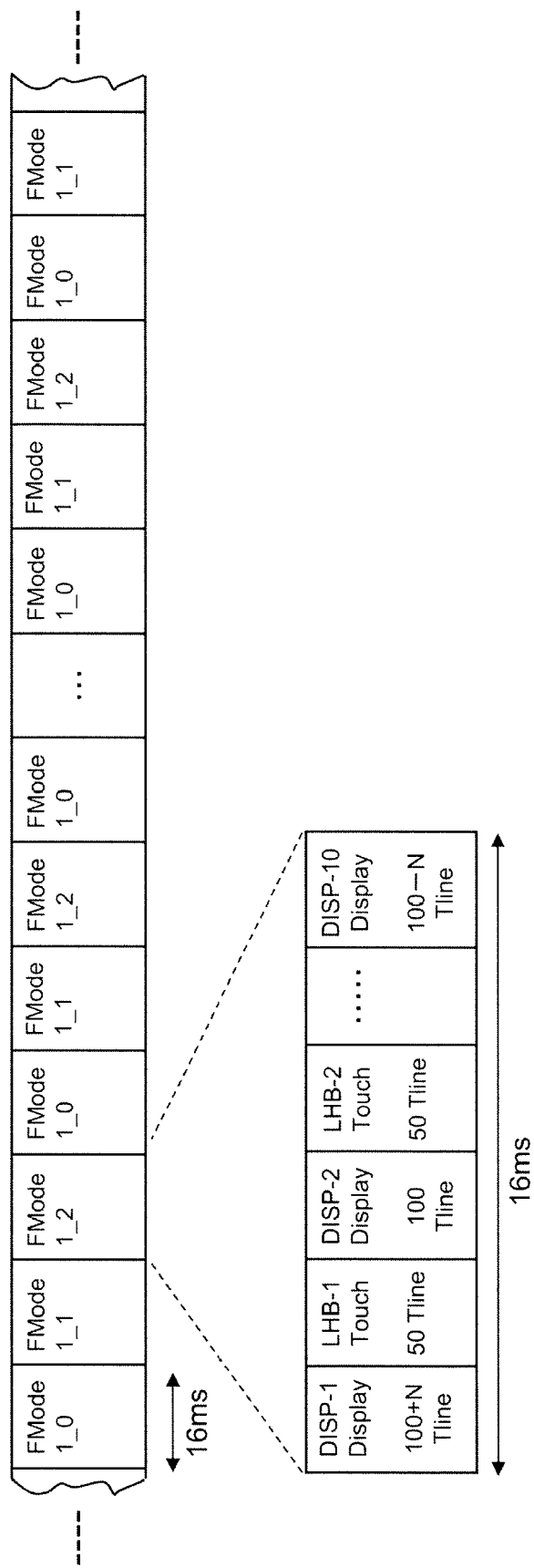

DISPLAY CONTROL AND TOUCH DETECTION DEVICE, SEMICONDUCTOR INTEGRATED CIRCUIT

CROSS-REFERENCE TO RELATED APPLICATIONS

This application is a continuation of U.S. patent application Ser. No. 15/434,754 filed on Feb. 16, 2017, which claims priority from Japanese application JP 2016-050709 filed on Mar. 15, 2016, the content of which is hereby incorporated by reference into this application.

BACKGROUND

The present invention relates to a display control and touch detection device, and a semiconductor integrated circuit for display control and touch detection, and it relates to a technique useful in application to a portable information terminal device, e.g. a tablet or a smart phone.

A portable information terminal device, such as a tablet or a smart phone has a panel module disposed on a surface thereof; the panel module is arranged by putting together or integrally forming a display panel and a touch panel. Such a portable information terminal device is able to determine, from touch coordinates, a touch operation performed on the surface of the touch panel by a finger or the like according to a screen display on the display panel in the event of the touch operation. In a mutual capacitance type touch panel supporting a multipoint touch or the like, many detection capacitances are formed at intersecting points of drive and detection electrodes arranged to cross each other like a matrix; detection signals are formed by integrating electric potential changes arising on the detection electrodes through the detection capacitances while driving the drive electrodes sequentially. With a finger located in the vicinity of the detection capacitance, a synthetic capacitance value resulting from the combination with the detection capacitance becomes smaller owing to the stray capacitance of the finger. The touch panel is arranged so that discrimination can be made between a touch and a non-touch based on the difference in detection signal depending on the capacitance value change. The touch panel of this type is disclosed in e.g. U.S. Patent Application No. 2007/0257890A1.

A liquid crystal panel has scan electrodes and signal electrodes, which are arranged to cross each other, and thin film transistors disposed at their intersecting points; the thin film transistors are each referred to as "TFT". The thin film transistors are arranged in such a way that the gate of each transistor is connected to the corresponding scan electrode, the source is connected to the corresponding signal electrode, and a liquid crystal element and a storage capacitor which make a sub-pixel are connected between the drain and a common electrode, whereby respective pixels are formed. In display control, the scan electrodes are activated sequentially. Thus, the thin film transistors are turned ON for each scan electrode and an electric current is caused to flow between the source and drain, during which signal voltages put on the source electrode lines are applied to the respective liquid crystal elements, consequently bringing them into a transmission state. Such a TFT liquid crystal panel is described in e.g. Japanese Unexamined Patent Publication No. JP-A-2006-301655.

In another patent document, JP-A-2012-234475, there is the description concerning the problem that with drive pulse voltages raised for activating scan electrodes of a touch panel, the noise exerts an adverse effect on a liquid crystal panel through the capacitive coupling, etc. between the display panel and the touch panel which are superposed on each other or integrally formed. In JP-A-2012-234475, a measure is taken by making possible to select the waveform of drive pulses for driving the scan electrodes.

In addition, the influence of noise attributed to the capacitive coupling, etc. between the display panel and the touch panel which are superposed on each other or integrally formed reaches even the display panel to the touch panel. The fact has been considered in JP-A-2014-146093. According to this, the noise coming from the action for driving/display of a display panel, and the noise coming from the action for driving/detection of a touch sensor can be prevented from influencing each other by driving the touch panel and performing the touch detection during a non-display term of the display panel rather than a display term in a cycle of a frame synchronizing signal. The difference in brightness arises in a display frame at each boundary of display and non-display terms especially in a case where the relation of the display and non-display terms is fixed in a cycle of the frame synchronizing signal; the larger the number of times the display and non-display terms are repeated is, the more remarkable the degradation of display quality owing to the undesired brightness difference is.

Therefore, a display controller arranged so that the start timings of display and non-display terms in the cycle of the frame synchronizing signal of a display frame can be changed at intervals of one or a plurality of cycles of the frame synchronizing signal is adopted in JP-A-2014-146093, which proposes a control device arranged to perform a display action in a display term and to conduct a touch detection action in a non-display term.

SUMMARY

Brief Description of the Drawings

FIG. 9 is an explanatory diagram showing an action flow in the first display mode in detail;

DETAILED DESCRIPTION

Introduction

Figure 1:
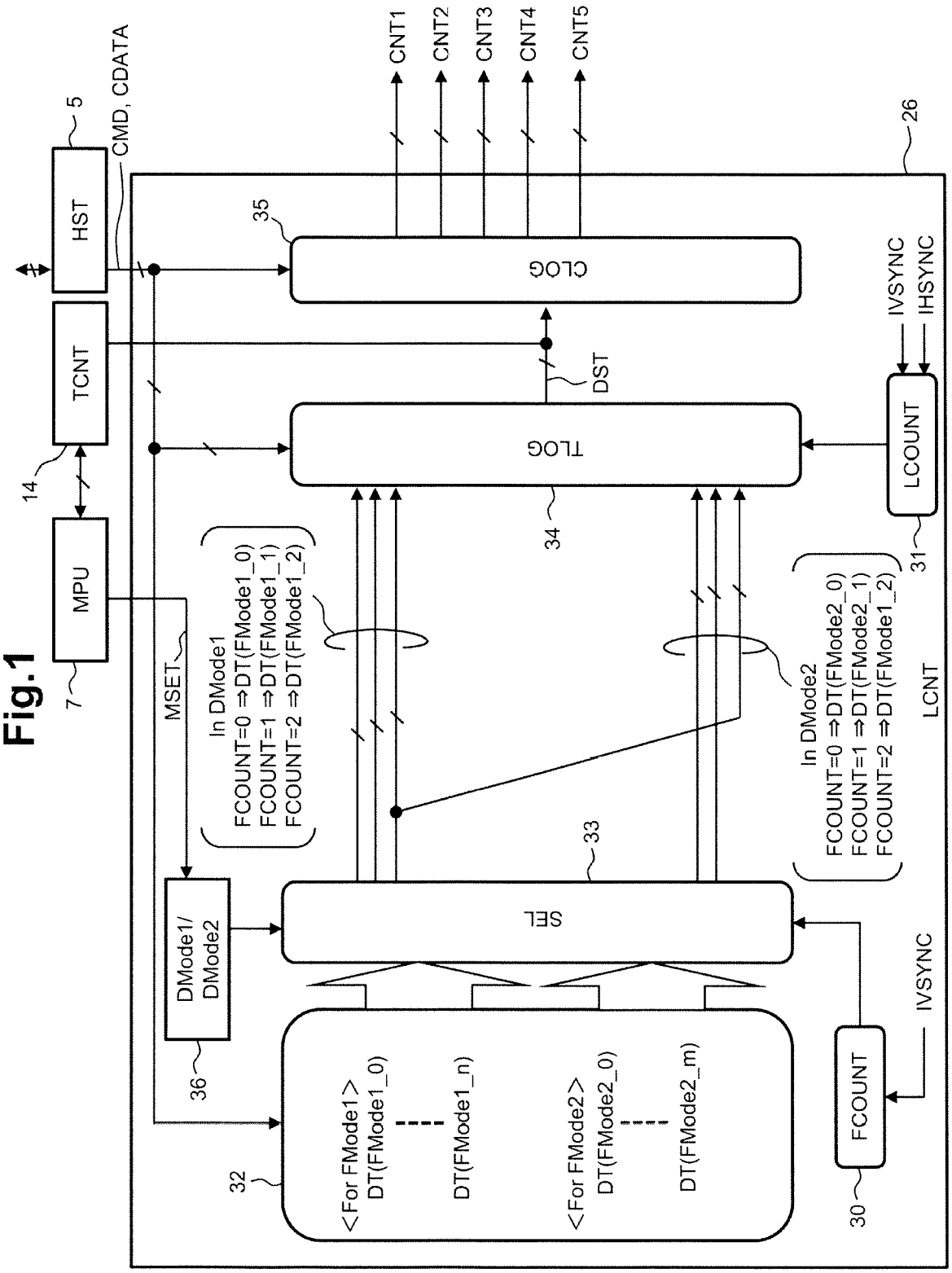
FIG. 1 is a block diagram showing an embodiment of a display control part of a display controller.

JP-A-2014-146093 discloses means for changing the start timings of display and non-display terms at intervals of one or a plurality of cycles of the frame synchronizing signal. An action mode in which the start timings of display and non-display terms are changed according to the result of touch detection is not taken into consideration in JP-A-2014-146093. To lower the frequency of touch detection or to keep suspending the touch detection action during a predetermined length of time in case that the state of no touch detection continues during a fixed length of time, the start timings of a display and non-display terms are changed to link with this control. In the case of keeping the touch detection action suspended during the predetermined length of time for the timing change like that, it may not be desired to only use all of the predetermined length of time as a display term. In the case of performing the display action at a speed faster than a data transfer rate at which a host device supplies display data a buffer memory can be used which has a storage capacity smaller than the display data size of a display frame, i.e. no frame buffer memory is prepared, a non-display term is used for accumulating display data to be displayed subsequently in a buffer memory even if the touch detection action is not performed. To lower the frequency of touch detection or to keep suspending the touch detection action during a predetermined length of time after the state of no touch detection continues for a fixed length of time is also based on the intention of avoiding a frivolous action in order to reduce power consumption. Therefore, an action mode for starting the display and non-display terms with the timings appropriate for the intention is described herein.

It is one object of this disclosure to provide a display control and touch detection device capable of controlling the start timings of display and non-display terms, depending on the result of touch detection, and a semiconductor integrated circuit for display control and touch detection.

The above and other objects of the disclosure, and novel features thereof will become apparent from the description hereof and the accompanying drawings.

Of the embodiments disclosed in the present application, the representative embodiments will be briefly outlined below.

It is noted that the reference numerals and others in parentheses for reference to the diagrams are only examples for easier understanding.

[1] Controlling the Way to Use Data Deciding the Start Timings of Display and Non-Display Based on the Result of Touch Detection A display control and touch detection device (4) includes: a display controller (8) which forms, in each display frame period (FLM), a plurality of display terms (DISP) and non-display terms (LHB) each arranged between the display terms, which performs display of display data on a display panel (2) in each display term, and which uses control data (DT(FMode1_0) to DT(FMode1_n)) of a first frame mode (FMode1) and control data (DT(FMode2_0) to DT(FMode2_m)) of a second frame mode (FMode2) to control the display and non-display terms, provided that in the first frame mode, start timings of the display and non-display terms are changed in units of the display frame period at intervals of a plurality of the display frame periods, and the second frame mode is different from the first frame mode in the start timings of the display and non-display terms; a touch controller (6) which performs touch detection on a touch panel (3) in the non-display term on an as-needed basis; and a microprocessor (7) which changes a way for the display controller to use the control data of the first frame mode and the control data of the second frame mode based on a result of the touch detection by the touch controller.

According to the embodiment like this, the display and non-display terms are changed in start timing in units of the display frame period. Therefore, it is possible to suppress the phenomenon of an undesired brightness difference appearing at a fixed location in a display frame owing to no display, and the phenomenon of the undesired brightness difference causing flicker. Further, the way to use data which decides display and non-display start timings is changed based on the result of touch detection. Therefore, it becomes possible to adapt to an action mode which allows each of the display and non-display terms to be started with a desired timing. For instance, in the case of performing the display action at a speed faster than the data transfer rate of display data supplied from the host device with no frame buffer memory prepared, a non-display term is used for accumulating display data to be displayed subsequently in a buffer memory even if the touch detection action is not performed and in addition, after the state of no touch detection continues for a fixed length of time, it becomes necessary to reduce the power consumption by lowering the frequency of the touch detection or keeping suspending the touch detection action during a predetermined length of time. With the embodiment like this, the start timings of the display and non-display terms in a display frame period can be readily changed according to the result of touch detection.

Figure 5:
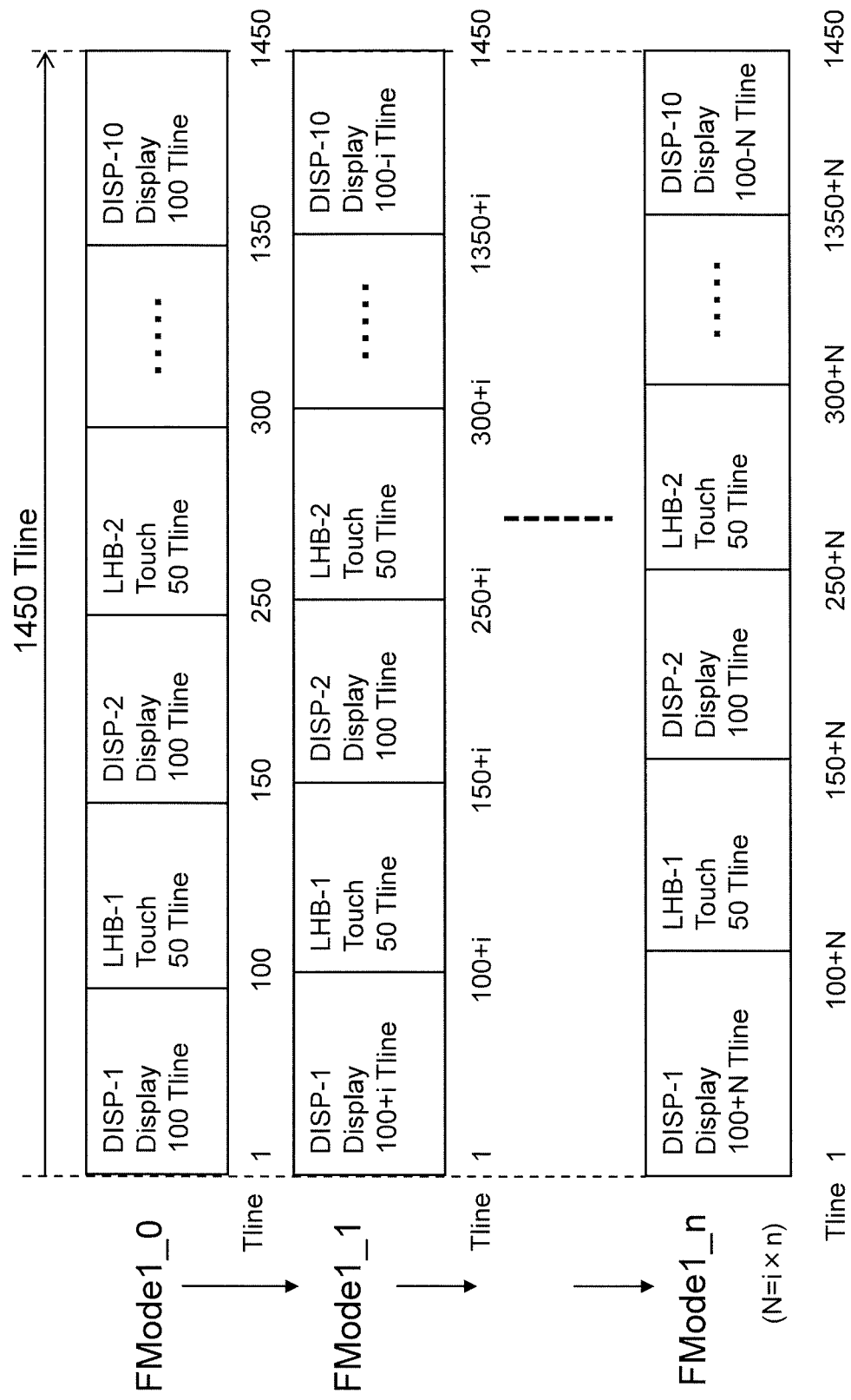
FIG. 5 is an explanatory diagram showing, by example, control data of the first frame mode (FMode1)
Figure 6:
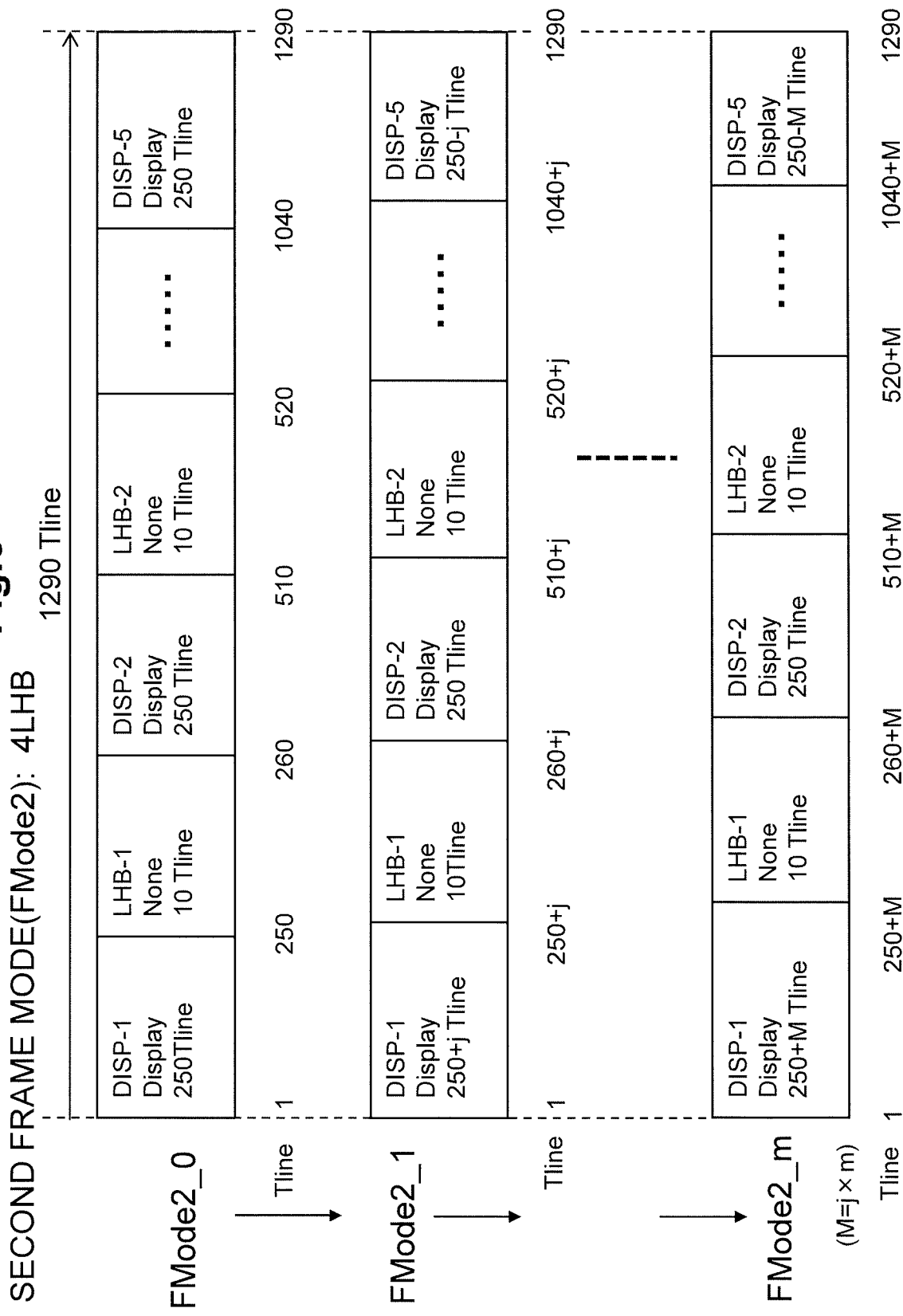
FIG. 6 is an explanatory diagram showing, by example, control data of the second frame mode (FMode2)

[2] Gradually Increase the First Display Term and Accordingly, Gradually Shorten the Last Display Term for Each Display Frame Period In the display control and touch detection device as described in [1], the display controller uses control data of the first frame mode and control data of the second frame mode to perform control to gradually increase the first display term by a predetermined length of time and gradually shorten the last display term by the predetermined length of time in each display frame period as control to change start timings of the display and non-display terms in units of the display frame period (FIGS. 5 and 6).

The embodiment like this facilitates the control for changing the start timings of display and non-display terms for each display frame period.

[3] First Frame Mode in which the Display Action is Allowed in a Display Term and the Touch Detection Action is Allowed in a Non-Display Term In the display control and touch detection device as described in [1], the display controller allows a display action in the display term and allows a touch detection action in the non-display term in the first frame mode (FIG. 5).

According to the embodiment like this, noise caused by one of a touch detection action and a display action never affects the other action in each display frame period even in such a working state that the touch detection is used during display.

[4] Second Frame Mode in which the Display Action is Allowed and the Touch Detection Action is not Allowed in a Display Term In the display control and touch detection device as described in [3], the display controller allows the display action in the display term and suppresses the touch detection action in the second frame mode (FIG. 6).

According to the embodiment like this, display terms are never formed uninterruptedly in a display frame period in such a case that the touch detection is not required. So, in case that the display action is performed at a speed faster than a transfer rate of display data supplied from the host device, a non-display term can be used to accumulate, in the buffer memory, display data to be displayed subsequently even if the touch detection action is not performed.

[5] Nonvolatile Memory Holding Control Data and Control Logic

In the display control and touch detection device as described in [1], the display controller has: a nonvolatile memory (32) operable to rewritably hold, as control data of the first frame mode, a plurality of sets of first control data (DT(FMode1_0) to DT(FMode1_n)) for each display frame period, which define the start timings of the display and non-display terms in units of the display frame period in the plurality of the display frame periods according to the first frame mode and as control data of the second frame mode, a plurality of sets of second control data (DT(FMode2_0) to DT(FMode2_m)) for each display frame period, which define the start timings of the display and non-display terms in units of the display frame period in the plurality of the display frame periods according to the second frame mode; and a control logic (33, 34, 35) which selects sets of control data from among the plurality of sets of first control data and the plurality of sets of second control data according to a mode designation (DMode1, DMode2) from the microprocessor for each display frame period, and produces control signals according to the display and non-display terms in each display frame period based on the selected sets of control data.

With the embodiment like this, the start timings of the display and non-display terms in each display frame period can be variously controlled according to the contents of first control data sets and the second control data sets stored in the nonvolatile memory and further, according to a select form of control data depending on a mode designation from the microprocessor. In short, the start timings of display and non-display terms in each display frame period can be controlled in a programmable manner readily.

[6] Define Display and Non-Display Terms with Display Line Clock Numbers in Turn In the display control and touch detection device as described in [5], the first and second control data are data for defining the start timings of the display and non-display terms by clock cycle numbers of display line clocks (IHSYNC) in synchronization with cycles of display lines of the display frame (FIGS. 5 and 6).

According to the embodiment like this, the start timings of the display and non-display terms can be defined readily.

[7] Control Logic

In the display control and touch detection device as described in [6], the control logic has: a first control logic (33) which selects sets of data from among the plurality of sets of first control data and the plurality of sets of second control data according to a mode designation from the microprocessor for each display frame period; a second control logic (34) which counts a cycle number of display line clocks for each display frame period and in parallel, produces status signals (DST) in turn each time the count value reaches the respective start timings of display and non-display terms in each display frame period, defined by data selected by the first control logic; and a third control logic (35) which receives the status signals and produces display control signals (CNT1 to CNT5) according to the received status signals. The touch controller receives the status signals, and produces touch control signals necessary for the touch detection control according to the received status signals.

According to the embodiment like this, status signals showing terms of display and no display are produced corresponding to the display and non-display terms. Therefore, necessary control signals can be readily produced by providing status signals to the circuit which produces control signals used for the display control, and the circuit which produces control signals used for the touch detection.

[8] First and Second Display Modes Designated by the Microprocessor

Figure 7:
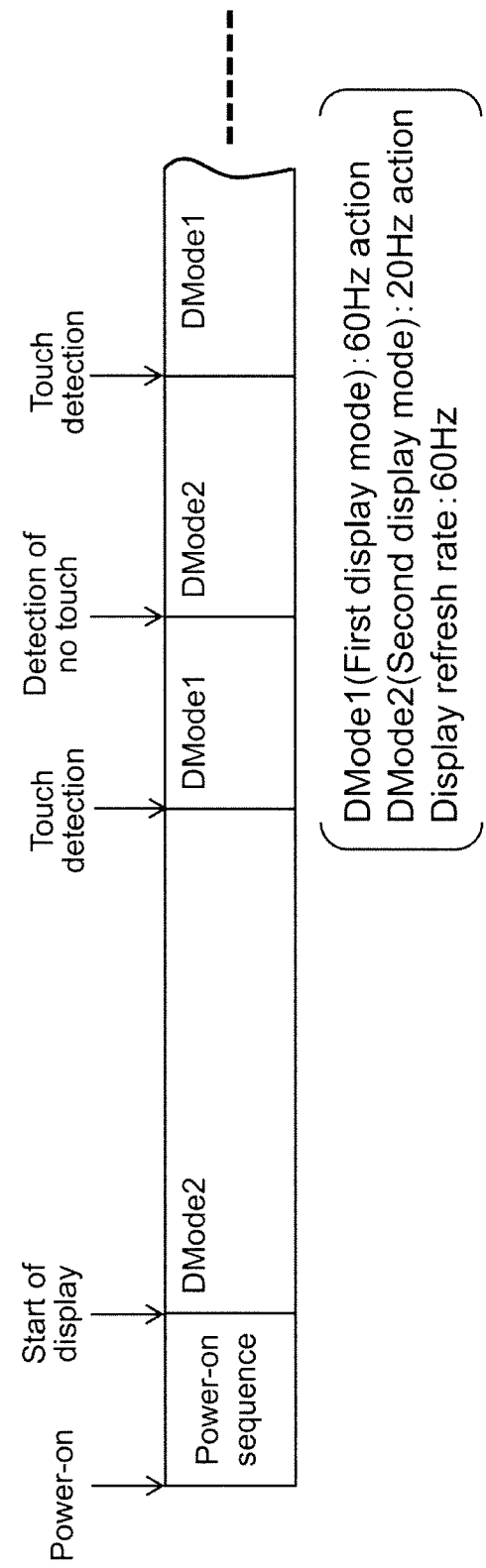
FIG. 7 is an explanatory diagram showing, by example, the whole action flow of the display control and touch detection device in a first display mode (DMode1) and a second display mode (DMode2)

In the display control and touch detection device as described in [1], the microprocessor notifies a second display mode (DMode2) for directing a way to use the control data to the display controller subsequently to a reset process; the microprocessor notifies a first display mode (DMode1) for directing another way to use the control data to the display controller on detection of a touch after the notification of the second display mode; and the microprocessor notifies the second display mode to the display controller in case that a given time has elapsed with a touch remaining undetected since the notification of the first display mode (FIG. 7).

According to the embodiment like this, the microprocessor can program-control the way to use the control data based on a touch or no touch, or an elapsed time since detection of a touch by means of mode designation.

Figure 10:
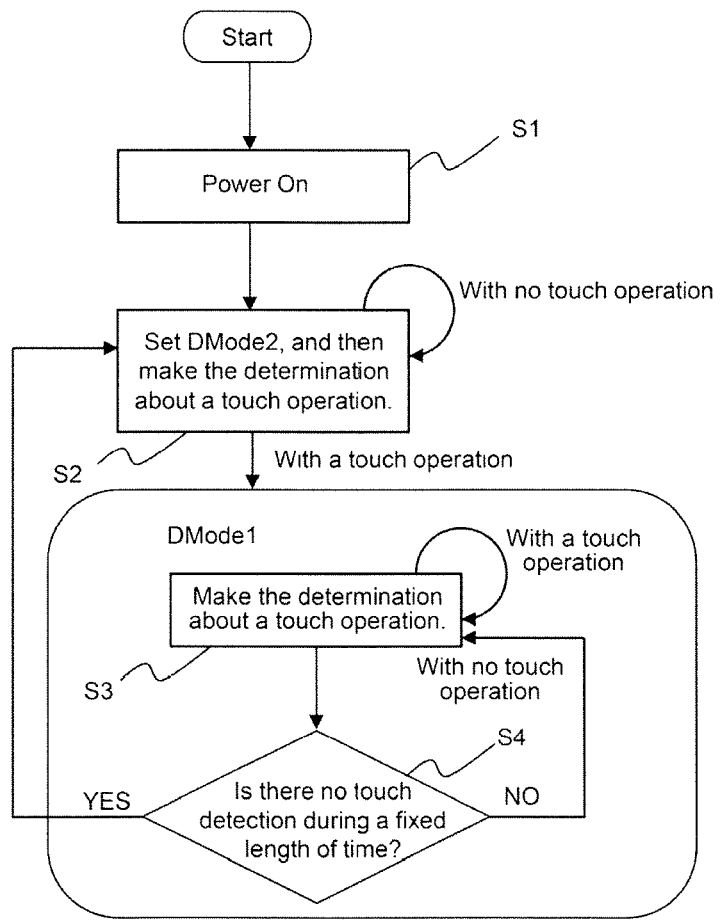
FIG. 10 is a flowchart showing a select action of a microprocessor in the first display mode or second display mode.

[9] First Display Mode with the First Frame Mode, and Second Display Mode with Both of the First and Second Frame Modes In the display control and touch detection device as described in [8], the first display mode is an action mode arranged to continue the first frame mode, provided that the plurality of the display frame periods make one unit in the first frame mode (FIG. 9). The second display mode is an action mode arranged to repeat the actions of: executing the second frame mode in part of display frame periods thereof, provided that the plurality of the display frame periods make one unit in the second frame mode; and executing, in the last display frame period, the first frame mode on the display frame period (FIG. 10). The display controller executes the display action and does not allow the touch detection action during each display term in respective display frame periods of the first frame mode, and allows the touch detection action and keeps the display action stopped during each non-display term therein; the display controller executes the display action and does not allow the touch detection action during each display term in respective display frame periods of the second frame mode, and keeps the display action stopped and does not allow the touch detection action during each non-display term therein.

According to the embodiment like this, noise produced by one of the touch detection action and the display action can be prevented from affecting the other action according to the first frame mode in the first display mode in which the touch detection is needed during display in each display frame period. Further, display terms are never formed uninterruptedly in the second frame mode in such a case that the touch detection is not required in each display frame mode. So, in case that the display action is performed at a speed faster than a transfer rate of display data supplied from the host device, display data to be displayed subsequently can be accumulated in the buffer memory by use of a non-display term even if the touch detection action is not performed. In addition, in the last display frame period in the second display mode, the touch detection action is allowed according to the first frame mode and as such, the determination on whether or not to go out of the second display mode and into the first display mode can be made. In this way the display action and the touch detection action can be executed while repeating the first and second display modes according to the wrap around manner.

[10] Control Logic Configured as a Program Processing Circuit

In the display control and touch detection device as described in [5], the control logic is a program processing circuit which performs process steps according to a control procedure defined by program data; and which data set to select from among the plurality of sets of first control data and the plurality of sets of second control data according to the designated mode is decided by the program data.

According to the embodiment like this, the degree of freedom of the ability to programmably decide the data set to use in the first and second control data sets by program data can be achieved.

[11] First Control Logic and Second Control Logic, Each Configured as a Program Processing Circuit In the display control and touch detection device as described in [7], the first control logic controls, based on program data, which data set to select from among the plurality of sets of first control data and the plurality of sets of second control data according to the designated mode.

According to the embodiment like this, the degree of freedom of the ability to programmably decide the data set to use in the first and second control data sets by program data can be achieved.

[12] Buffer Memory of FIFO Access Form

In the display control and touch detection device as described in [5], the display controller has a buffer memory which holds display data supplied from the host device, and accepts an access to the display data according to a first-in, first-out method under the control of the control logic, and the control logic accesses the buffer memory according to the first-in, first-out method on an as-needed basis in the display and non-display terms.

According to the embodiment like this, even if the display action is performed at a speed faster than the transfer rate of display data supplied from the host device, the shortage of data used for display can be suppressed by the access control according to the first-in, first-out method, in which the display and non-display terms are both used. Therefore, it becomes possible to absorb the difference in data transfer rate,

[13] Buffer Memory Smaller than the Data Size of a Display Frame

In the display control and touch detection device as described in [12], the buffer memory has a storage capacity of a data amount smaller than a maximum display data amount which can be displayed in one display frame.

The embodiment like this can contribute to the downsizing of a display and touch control device unlike an embodiment arranged so that a frame buffer is included.

[14] Microprocessor which Controls the Way for the Display Control Part to Use Frame Mode Data A semiconductor integrated circuit (4) includes: a display controller (8) which forms, in each display frame period (FLM), a plurality of display terms (DISP) and non-display terms (LHB) each arranged between the display terms, and which performs display of display data on a display panel (2) in each display term; a touch controller (6) which performs touch detection on a touch panel (3) in the non-display term on an as-needed basis; and a microprocessor (7) connected with the display controller and the touch controller. The display controller has a display control part (26) which uses control data (DT(FMode1_0) to DT(FMode1_$n$)) of a first frame mode (FMode1) and control data (DT(FMode2_0) to DT(FMode2_$m$)) of a second frame mode (FMode2) to control the display and non-display terms, provided that in the first frame mode, start timings of the display and non-display terms are changed in units of the display frame period at intervals of a plurality of the display frame periods, and the second frame mode is different from the first frame mode in the start timings of the display and non-display terms. The microprocessor performs control for changing the way for the display control part to use the first frame mode control data and the second frame mode control data based on the result of the touch detection by the touch controller.

The embodiment like this enables the suppression of the phenomenon of an undesired brightness difference appearing at a fixed location in a display frame owing to no display and the phenomenon of the occurrence of flicker resulting from the undesired brightness difference, and further enables the easy change of the display and non-display terms in start timing in each display frame period according to the result of touch detection in the same way as the embodiment described in [1] does.

[15] Nonvolatile Memory Holding Control Data and Control Logic

In the semiconductor integrated circuit as described in [14], the display control part has: a nonvolatile memory (32) operable to rewritably hold, as control data of the first frame mode, a plurality of sets of first control data (DT (FMode1_0) to DT(FMode1_$n$)) for each display frame period, which define the start timings of the display and non-display terms in units of the display frame period in the plurality of the display frame periods according to the first frame mode and as control data of the second frame mode, a plurality of sets of second control data (DT(FMode2_0) to DT(FMode2_$m$)) for each display frame period, which define the start timings of the display and non-display terms in units of the display frame period in the plurality of the display frame periods according to the second frame mode; and a control logic (33, 34, 35) which selects sets of control data from among the plurality of sets of first control data and the plurality of sets of second control data according to a mode designation from the microprocessor for each display frame period, and produces control signals according to the display and non-display terms in each display frame period based on the selected sets of control data.

The embodiment like this enables the easy programmable control of the display and non-display terms in start timing in each display frame period in the same way as the embodiment described in [2] does.

[16] Define the Display and Non-Display Terms with Display Line Clock Numbers in Turn In the semiconductor integrated circuit as described in [15], the first and second control data are data for defining the start timings of the display and non-display terms by clock cycle numbers of display line clocks (IHSYNC) in synchronization with cycles of display lines of the display frame (FIGS. 5 and 6).

According to the embodiment like this, the start timings of the display and non-display terms can be defined readily.

[17] Control Logic

In the semiconductor integrated circuit as described in [16], the control logic has: a first control logic (33) which selects sets of data from among the plurality of sets of first control data and the plurality of sets of second control data according to a mode designation from the microprocessor for each display frame period; a second control logic (34) which counts a cycle number of display line clocks for each display frame period and in parallel, produces status signals (DST) in turn each time the count value reaches the respective start timings of display and non-display terms in each display frame period, defined by data selected by the first control logic; and a third control logic (35) which receives the status signals and produces display control signals according to the received status signals. The touch controller receives the status signals, and produces touch control signals necessary for the touch detection control according to the received status signals.

According to the embodiment like this, the control signals for the display control and the touch detection can be produced by providing status signals to the circuit operable to produce control signals used for the display control and the circuit operable to produce control signals used for the touch detection in the same way as described in the embodiment described in [7].

[18] First and Second Display Modes Directed by the Microprocessor

In the semiconductor integrated circuit as described in [14], the microprocessor notifies a second display mode (DMode2) to the display control part subsequently to a reset process; the microprocessor notifies a first display mode (DMode1) to the display control part on detection of a touch after the notification of the second display mode; and the microprocessor notifies the second display mode to the display control part in case that a given time has elapsed with a touch remaining undetected since the notification of the first display mode (FIG. 7).

According to the embodiment like this, the microprocessor can program-control the way to use the control data based on a touch or no touch, or an elapsed time since detection of a touch by means of mode designation as in the embodiment described in [8].

[19] First Display Mode Using the First Frame Mode, and Second Display Mode Using Both of the First and Second Frame Modes In the semiconductor integrated circuit as described in [18], the first display mode is an action mode arranged to continue the first frame mode, provided that the plurality of the display frame periods make one unit in the first frame mode (FIG. 9). The second display mode is an action mode arranged to repeat the actions of: executing the second frame mode in part of display frame periods thereof, provided that the plurality of the display frame periods make one unit in the second frame mode; and executing, in the last display frame period, the first frame mode on the display frame period (FIG. 10). The display control part executes the display action and does not allow the touch detection action during each display term in respective display frame periods of the first frame mode, and allows the touch detection action and keeps the display action stopped during each non-display term therein; the display control part executes the display action and does not allow the touch detection action during each display term in respective display frame periods of the second frame mode, and keeps the display action stopped and does not allow the touch detection action during each non-display term therein.

According to the embodiment like this, the display action and the touch detection action can be executed while repeating the first and second display modes according to the wrap around manner as in the embodiment described in [9].

[20] Second Control Part which Controls the Way for the First Control Part to Use Data of the Frame Modes A display control and touch detection device (4) forms, in each display frame period (FLM), a plurality of display terms (DISP) and non-display terms (LHB) each arranged between the display terms, performs display control on a display panel (2) in the display term, performs touch detection control on a touch panel (3) in the non-display term on an as-needed basis, and performs control for changing start timings of the display and non-display terms in units of the display frame period at intervals of a plurality of the display frame periods. The display control and touch detection device includes: a first control part (26) which uses control data (DT(FMode1_0) to DT(FMode1_$n$)) of a first frame mode (FMode1) and control data (DT(FMode2_0) to DT(FMode2_$m$)) of a second frame mode (FMode2) to control the display and non-display terms, provided that in the first frame mode, start timings of the display and non-display terms are changed in units of the display frame period at intervals of the plurality of the display frame periods, and the second frame mode is different from the first frame mode in the start timings of the display and non-display terms; and a second control part (7) which changes a way for the first control part to use the control data of the first frame mode and the control data of the second frame mode based on a result of touch detection according to the touch detection control.

The embodiment like this enables the suppression of the phenomenon of an undesired brightness difference appearing at a fixed location in a display frame owing to no display and the phenomenon of the occurrence of flicker resulting from the undesired brightness difference, and further enables the easy change of the display and non-display terms in start timing in each display frame period according to the result of touch detection as the embodiment described in [1] does.

The effect achieved by a representative one of the embodiments disclosed in the present application will be briefly described below.

The start timings of the display and non-display terms can be controlled depending on the result of touch detection.

Example Embodiments

Figure 2:
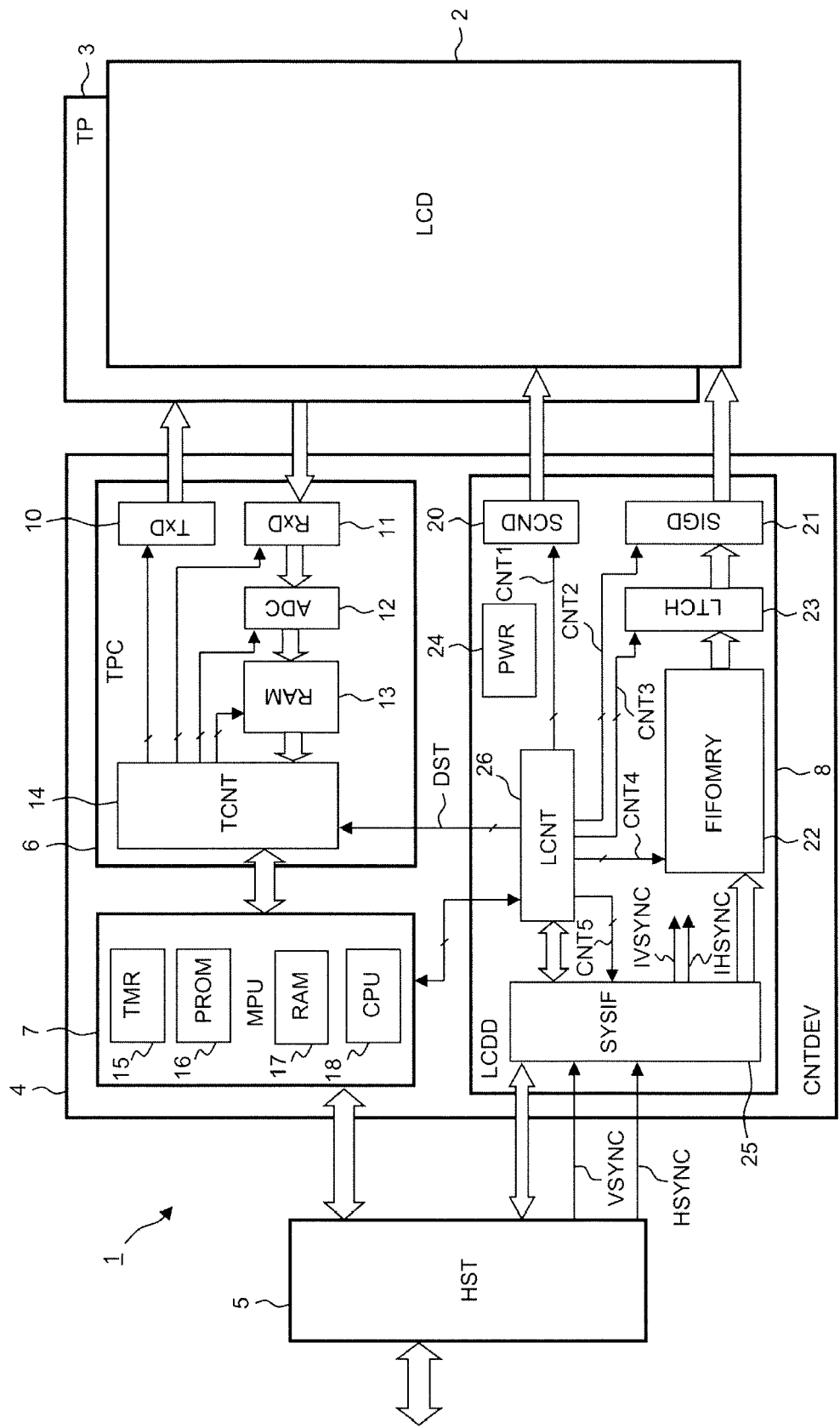
FIG. 2 is a block diagram showing an embodiment of a display control and touch detection device.

A display control and touch detection device 4 is shown by example in FIG. 2, which is applied to a portable information terminal device such as a tablet or smart phone. The portable information terminal device 1 has a display panel (LCD) 2, such as a dot matrix type liquid crystal display panel and a touch panel (TP) 3 which enables the touch detection by a mutual capacitance technique, which are formed on a surface of its housing in such a way that they are superposed on each other. Any structure of e.g. an external-attachment structure in which the touch panel 3 is superposed on a display plane of the display panel 2, and an in-cell structure in which the touch panel 3 is built in the display panel 2 may be adopted for the portable information terminal device. The display control and touch detection device 4 has: a display controller (LCDD) 8 serving as a display control part which performs the display control of the display panel 2; a touch controller(TPC) 6 serving as a touch control part which performs the touch detection control of the touch panel 3; and a microprocessor (MPU) 7 serving as a calculation control part or second control part which performs calculation control. The display controller 8 and the microprocessor 7 are interfaced with the host device 5. The host device (HST) 5 includes a host computer playing a pivotal role, a communication circuit for mobile communication, near field communication, etc. and various peripheral devices, for example.

While the display control and touch detection device 4 is not particularly limited, it may be formed on a substrate of a semiconductor such as single crystal silicon according to known CMOS integrated circuit manufacturing techniques and materialized as a semiconductor integrated circuit of a single chip. Alternately, it may be realized as a semiconductor module product of a multichip.

Figure 3:
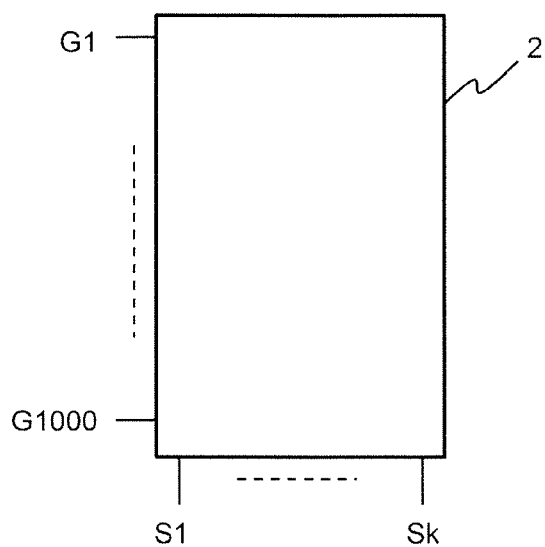
FIG. 3 is an explanatory diagram schematically showing a display panel having gate lines and source lines arranged to cross each other.

As shown by example in FIG. 3, pixels are formed in the display panel 2, in which scan electrodes G1 to G1000 and signal electrodes S1 to Sk are arranged to cross each other; thin film transistors referred to as TFTs are disposed at their intersecting points respectively; the scan electrodes G1 to G1000 of rows are connected to gates of the thin film transistors; the signal electrodes S1 to Sk of columns are connected to sources of the thin film transistors; and a liquid crystal element and a storage capacitor are connected between the drain of each thin film transistor and a common electrode, forming a sub-pixel. In display control, the display controller 8 sequentially drives the scan electrodes G1 to G1000 to turn on the thin film transistors in units of the scan electrode, while signal voltages according to display data are put on the signal electrodes S1 to Sk and thus, the respective signal voltages are applied to the liquid crystal elements and the storage capacitors. Thus, the liquid crystal elements are controlled in the transmission state thereof, and an image is displayed on the display panel 2 with desired gradations.

While not particularly shown in the diagram, in e.g. a mutual capacitance type touch panel 3 supporting the multipoint touch, many detection capacitances are formed at intersecting positions of drive electrodes and detection electrodes, which are arranged to cross each other, like a matrix; detection signals are formed by integrating electric potential changes arising on the detection electrodes through the detection capacitances while the touch controller 6 sequentially drives the drive electrodes. With a finger located in the vicinity of the detection capacitance, a synthetic capacitance value resulting from the combination with the detection capacitance becomes smaller owing to the stray capacitance of the finger. The touch panel is arranged so that discrimination can be made between a touch and no touch based on the difference in detection signal depending on the capacitance value change. The result of detection concerning a touch/no touch is supplied to the microprocessor 7. Based on the result of the detection, the microprocessor 7 can determine the operation from touch coordinates of a multipoint touch performed on the touch panel 3 according to a screen display on the display panel 2.

The touch panel controller 6 has e.g. a drive circuit (TxD) 10, a detection circuit (RxD) 11, an analog-to-digital conversion circuit (ADC) 12, a RAM 13 and a touch control circuit (TCNT) 14 as shown in FIG. 2. The drive circuit 10 outputs drive pulses to the plurality of drive electrodes of the touch panel 3 sequentially. Voltage changes arising on the respective detection electrodes through the detection capacitances connected with each drive electrode thus driven are each accumulated by the integration circuit of the detection circuit 11, thereby forming detection signals for each detection electrode. The detection signals are converted from analog signals into digital signals by ADC 12. The resultant digital signals are accumulated by RAM 13 as detection data. The touch control circuit 14 controls the timing of driving the drive circuit 10 and controls, in synchronization therewith, the action timing of the detection circuit 11 and ADC 12, and the write action to RAM 13. Detection data resulting from the drive electrode driving and detecting actions over the whole surface of the touch panel 3, namely the driving and detecting actions on the touch panel 3 in units of the frame are accumulated by RAM 13 and then, the touch control circuit 14 passes the detection data to the microprocessor 7. The microprocessor 7 determines a touch or no touch based on the detection data. The microprocessor calculates the position coordinates of a touch position in the touch panel 3 and provides the result of the calculation to the host device 5. The touch detection action by the touch control circuit 14 by use of the drive circuit 10 and the detection circuit 11 is enabled while a status signal DST output by the display controller 8 shows at least a non-display term.

Although no special restriction is intended on the microprocessor 7, a central processing unit (CPU) 18 executes programs stored in a rewritable nonvolatile memory (PROM) 16 in turn for data processing. The RAM 17 serves as a work region of CPU 18. The microprocessor includes a timer counter (TMR) 15, which is representatively shown as a peripheral circuit of CPU 18.

As in FIG. 2, the display controller 8 has a display control circuit (LCNT) 26 as a first control part operable to perform total control of e.g. a scan driving circuit (SCND) 20, a gradation drive circuit (SIGD) 21, a FIFO buffer memory (FIFOMRY) 22 accessed according to a first-in, first-out method, a line latch circuit (LTCH) 23, a power supply circuit (PWR) 24, a host interface circuit (SYSIF) 25 and a display controller 8, and it performs the display control of the display panel 2 and directs the touch controller to conduct a touch detection action in synchronization with internal synchronizing signals. Although no special restriction is intended, the internal synchronizing signals are internal frame synchronizing signals IVSYNC and internal horizontal synchronizing signals IHSYNC. The internal frame synchronizing signals IVSYNC have a cycle depending on a display frame period. Although no special restriction is intended, the internal frame synchronizing signals have a frequency of 60 Hz, in which one cycle is made 16 msec. The internal horizontal synchronizing signals IHSYNC represent display line clocks in synchronization with respective cycles of a plurality of display lines, included in a display frame period; the frequency may be decided according to the number of display lines of the display panel 2 driven by the display controller 8, namely the number of scan electrodes appropriately. The synchronizing signals VSYNC and HSYNC supplied from the host device 5 to the host interface circuit 25 are synchronizing signals when supplying display data, which are external frame synchronizing signals VSYNC and external horizontal synchronizing signals HSYNC. Incidentally, the internal frame synchronizing signals IVSYNC and the internal horizontal synchronizing signals IHSYNC are always issued by the power-on reset of the display control and touch detection device 4.

The host interface circuit 25 receives a display command and display data from the host device 5. The received display data are accumulated in the FIFO buffer 22 one by one in order to absorb the difference between a display data supplying rate and a display action speed, and sequentially read out to catch up with the display timing and transmitted to the line latch circuit 23. The gradation drive circuit 21 outputs gradation voltages to the plurality of signal electrodes of the display panel 2 according to display data latched by the line latch circuit 23 in parallel.

The scan driving circuit 20 sequentially drives the scan electrodes of the display panel 2 in synchronization with horizontal synchronizing signals HSYNC for each frame cycle in a display term. As a result of this, the thin film transistors are turned on in units of the scan electrode; the gradation drive circuit 21 applies signal voltages to the liquid crystal elements through the signal electrodes in each horizontal scan period based on display data latched by the line latch circuit 23 at that time. Thus, the liquid crystal elements are driven by gradation data in units of the display line put in synchronization with the sequential scan driving of the scan electrodes in units of the frame cycle. The power supply circuit 24 produces gradation voltages to be output by the gradation drive circuit 21, scan drive voltages to be output by the scan driving circuit 20, etc.

The display control circuit 26 performs total control of the display controller 8, including the above display control, according to the display command supplied from the host device 5. CNT1 is a drive control signal for the scan driving circuit 20, CNT2 is a drive control signal for the gradation drive circuit 21, CNT3 is a latch control signal for the line latch circuit 23, CNT4 is an access control signal for the FIFO buffer memory 22, and CNT5 is an input/output control signal for the host interface circuit 25.

Figure 4:
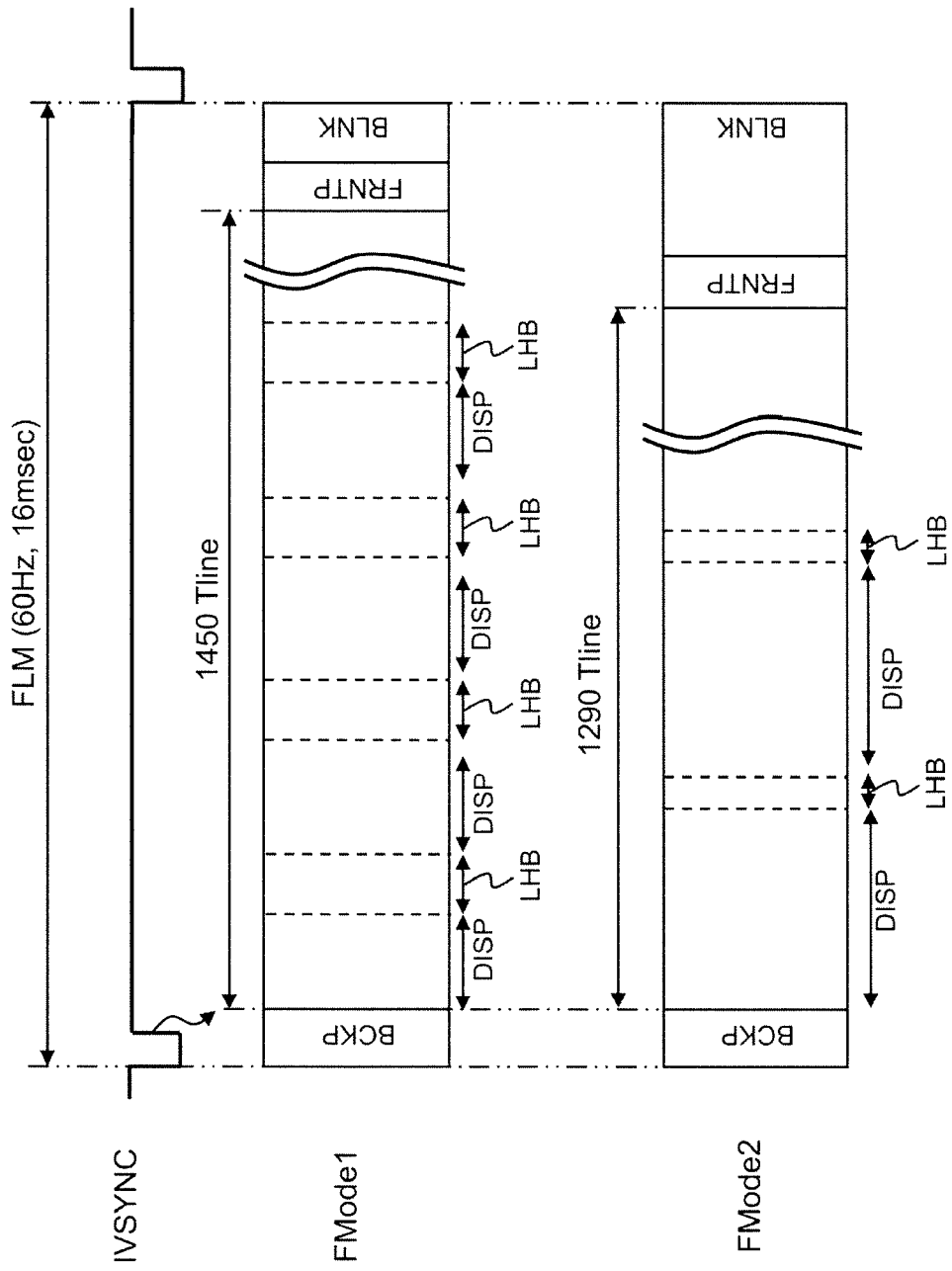
FIG. 4 is an explanatory diagram showing display and non-display terms in a display frame period in each of first and second frame modes.

Further, the display control circuit 26 forms, in a display frame period FLM, a plurality of display terms DISP and non-display terms LHB each sandwiched between the display terms DISP, as shown by example in FIG. 4. The display frame period FLM refers to the period of one cycle of the internal frame synchronizing signal IVSYNC. Although no special restriction is intended, the following are formed in the display frame period FLM: a back porch BCKP at its head; the plurality of display terms DISP and non-display terms LHB which are disposed after the back porch; a front porch FRTP subsequent thereto; and a blank period BLNK. In a display term DISP, the display action is performed in which the pixels are selected in units of the scan electrode, and drive voltages are applied to the signal electrodes. In a non-display term LHB, the display action is stopped temporarily. In the non-display term, the touch controller 6 enables a touch detection action. As described here, the display term is a duration during which the display controller 8 performs the display action on the display panel 2; the non-display term is a period during which the display action is not conducted.

The start timings of the display term DISP and the non-display term LHB are changed in units of the display frame period at intervals of a plurality of display frame periods; one embodiment of the change is specific to the first frame mode FMode1, and another is specific to the second frame mode FMode2. The arrangement of display terms DISP and non-display terms LHB in a display frame period in the first frame mode FMode1, and the arrangement of the display terms DISP and the non-display terms LHB in a display frame period in the second frame mode FMode2 are shown by example in FIG. 4.

FIG. 5 shows, by example, the embodiment of changing the start timings of the display term DISP and the non-display term LHB in units of the display frame period at intervals of a plurality of (n) display frame periods in the first frame mode FMode1. As to the action form FMode1_0, each start timing is shown implicitly in such a way that the bounds of the array of display terms DISP and non-display terms LHB in the first display frame period are each shown by a clock number Tline of internal horizontal synchronization clocks IHSYMNC, which are display line clocks. The suffixes attached to the display terms DISP and non-display terms LHB each represent the place of the period concerned in the array of the display and non-display terms; Display implies that the display action should be performed; and Touch implies that the touch detection action should be conducted. In this embodiment, the clock numbers Tline of the display terms DISP are almost 100, during which the display action is performed; and the clock numbers Tline of the non-display terms LHB are 50, during which the touch detection action is performed. The subsequent display frame period is shown in the action form FMode1_1. The subsequent display frame period is different from that in FMode1_0 in that the clock number Tline of the first display term DISP-1 is increased to 100+i, and the clock number Tline of the last display term DISP-10 is decreased to 100−i. The last n+1$^{-th}$ display frame period is shown in the action form FMode1_n. The last display frame period in FMode1_n is different from that in FMode1_0 in that the clock number Tline of the first display term DISP-1 is increased to 100+N (N=i×n) from 100, and the clock number Tline of the last display term DISP-10 is decreased to 100−N from 100. With the first frame mode FMode1, in the action forms FMode1_0 to FMode1_n of the display frame periods as described above, the display terms DISP and non-display terms LHB are shifted in start timing by the clock number "i" (Tline) with the increment in the number of the suffixes of the individual display frame periods; in each form, 10 display terms DISP and 9 non-display terms LHB are involved, and its last timing is fixed and kept at 1450 Tline. In each action form FMode1_0 to FMode1_n of the first frame mode FMode1, the touch detection action by use of the non-display term LHB is performed in such a way that the touch panel 3 is subjected to the full-screen scanning once.

Therefore, the touch determination, including touch coordinate calculations based on the detection action of the full-screen scanning of the touch panel can be performed at intervals of 16 msec of the display frame period.

FIG. 6 shows, by example, the embodiment of changing the start timings of the display term DISP and the non-display term LHB in units of the display frame period at intervals of a plurality of (m) display frame periods in the second frame mode FMode2. As to the action form FMode2_0, the start timing is shown implicitly in such a way that the bounds of the array of the display terms DISP and non-display terms LHB in the first display frame period are each shown by a clock number Tline of internal horizontal synchronization clocks IHSYMNC, which are display line clocks. Each of the suffixes attached to the display terms DISP and non-display terms LHB represents the place of the period concerned in the array of the display and non-display term periods; "Display" represents that the display action should be performed; and "None" represents that the touch detection action should be suppressed. In this embodiment, the clock numbers Tline of the display terms DISP are almost 250, during which the display action is performed; and the clock numbers Tline of the non-display terms LHB are 10, during which the touch detection action is not performed. The subsequent display frame period is shown in the action form FMode2_1. The subsequent display frame period is different from that in FMode2_0 in that the clock number Tline of the first display term DISP-2 is increased to 250+j from 250, and the clock number Tline of the last display term DISP-5 is decreased to 250−j from 250. The last n+1$^{-th}$ display frame period is shown in the action form FMode2_m. The last display frame period is different from that in FMode2_0 in that the clock number Tline of the first display term DISP-1 is increased to 250+M (M=j×m) from 250, and the clock number Tline of the last display term DISP-5 is decreased to 250–M from 250. With the second frame mode FMode2, in the action forms FMode2_0 to FMode2_m of the display frame periods as described above, the display terms DISP and non-display terms LHB are shifted in start timing by the clock number "j" (Tline) with the increase in the number of the suffixes of the individual display frame periods; in each display frame period, five display terms DISP and four non-display terms LHB are involved, and its last timing is fixed and kept at 1290 Tline.

As is clear from the description presented with reference to FIGS. 5 and 6, the display action is performed in a display term DISP and the touch detection action is performed in a non-display term LHB in the first frame mode FMode1. In contrast, in the second frame mode FMode2, the display action is performed in a display term DISP, and the touch detection action is not performed in a non-display term LHB. Therefore, in the case of using the first frame mode FMode1 and the second frame mode FMode2 separately, no touch detection is performed in the second frame mode FMode2 and as such, it is impossible to return to the first frame mode FMode1 from the second frame mode FMode2 according to the result of touch detection. Taking into account this point, the microprocessor 7 is arranged to cause the display control circuit 26 to change the way to use control data of the first frame mode FMode1 and control data of the second frame mode FMode2 based on the result of touch detection by the touch controller 6. Although no special restriction is intended, the embodiments of the way to use control data of the first frame mode FMode1 and control data of the second frame mode FMode2 include two kinds, i.e. a first display mode DMode1 and a second display mode DMode2.

FIG. 9 shows, by example, the form of utilizing the frame modes FMode1 and FMode2 on condition that the first display mode DMode1 is specified. The first display mode DMode1 is an action mode consisting of a series of the first frame modes FMode1 in which a plurality of display frame periods make one unit. In the example of FIG. 9, the first frame modes are in succession; in each first frame mode, a series of three action forms FMode1_0, FMode1_1 and FMode1_2 when that n=2 in the example of FIG. 5 make one unit. In the first display mode DMode1, a display term DISP in which the display action is performed, and a non-display term LHB in which the touch detection action is performed are repeated in each display frame period. In other words, the touch determination, including touch coordinate calculations based on the touch detection can be performed at intervals of 16 msec of each display frame period.

Figure 8:
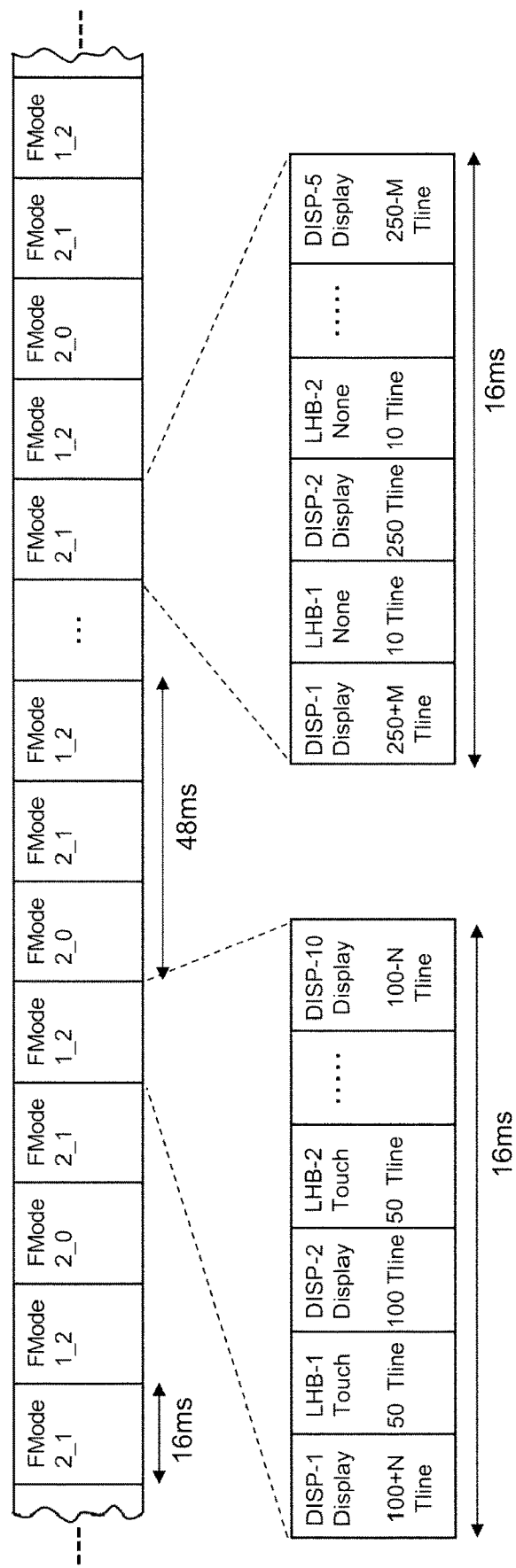
FIG. 8 is an explanatory diagram showing an action flow in the second display mode in detail.

FIG. 8 shows, by example, the form of utilizing the frame mode on condition that the second display mode DMode2 is specified. The second display mode DMode2 is an action mode for repeating the action of: executing, in part of display frame periods thereof, the second frame mode FMode2 in which the plurality of display frame periods form one unit; and executing, in the last display frame period, the first frame mode FMode1 on the display frame period. In the example of FIG. 8, the action in which a second frame mode corresponding to two action forms FMode2_0 and FMode2_1 in FIG. 6, and a first frame mode corresponding to the last action form FMode1_2 when n=2 in the example of FIG. 5 are handled in combination as one unit is repeated. In the second display mode DMode2, the touch detection action is performed by using the non-display terms LHB at a rate of one display frame period in three display frame periods. That is, the touch determination including touch coordinate calculations based on touch detection at intervals of 48 msec representing display frame periods of three frames can be performed.

An embodiment of the display control circuit 26 supporting the first and second display modes is illustrated in FIG. 1. The display control circuit 26 has: a frame counter (FCOUNT) 30; a line counter(LCOUNT) 31; a nonvolatile memory 32; a first control logic (SEL) 33; a second control logic (TLOG) 34; a third control logic (CLOG) 35; and a mode register 36.

The nonvolatile memory 32 rewritably stores a plurality of sets of first control data DT(FMode1_0) to DT(FMode1_n) as the control data of the first frame mode FMode1 and a plurality of sets of second control data DT(FMode2_0) to DT(FMode2_m) as the control data of the second frame mode FMode2. While not shown in the diagram, the host device 5 controls the rewrite on the nonvolatile memory 32 through the host interface 25.

The plurality of sets of first control data DT(FMode1_0) to DT(FMode1_n) are sets of data for the action forms FMode1_0 to FMode1_n respectively, which adapt to the first frame mode FMode1 and define the start timings of the display term DISP and non-display term LHB for each display frame period in the plurality of display frame periods. As described with reference to FIG. 5, the plurality of sets of first control data include data showing a term number, either Display action (Display) or Touch detection (Touch), and the number of clocks of the term, which is represented by Tline, for each of the display term and the non-display term LHB in each action form FMode1_0 to FMode1_n.

The plurality of sets of second control data DT(FMode2_0) to DT(FMode2_m) are sets of data for the action forms FMode2_0 to FMode2_m respectively, which adapt to the second frame mode FMode2, and define the start timings of the display term DISP and non-display term LHB for each display frame period in the plurality of display frame periods. As described with reference to FIG. 6, the plurality of sets of second control data include data showing a term number, either Display action (Display) or Touch detection suppressed (None), the number of clocks of the term, which is represented by Tline, for each of the display term and the non-display term LHB in each action form FMode2_0 to FMode2_m.

On the mode register 36, the microprocessor 7 variably sets display mode data of the first display mode DMode1 or second display mode DMode2 by mode-set signals MSET. The action of the microprocessor 7 setting the mode data is performed based on the control flow shown by example in FIG. 10. Specifically, after power-on (S1), the display mode is made the second display mode DMode2 at the beginning. Then, the determination about whether a touch operation has been performed or not is made at a frequency specified in the mode; the display mode lasts until a touch operation is determined to be performed (S2). After a touch operation has been determined to be performed, the display mode is changed to the first display mode DMode1, and then the determination about whether a touch operation has been performed or not is made for each display frame according to the touch detection action (S3). The microprocessor 7 starts the timer counter 15 on the change to the first display mode. Then, in the event of determination of a touch operation before the time of elapse of a fixed length of time, when it is to time out, the microprocessor resets the timer counter 15 to restart the operation of the timer from the beginning. In contrast, in case that a touch operation cannot be determined before the elapse of the fixed length of time, the microprocessor changes the display mode to the second display mode DMode2 in response to the time-out of the timer counter 15. After that, the same control actions are repeated. The action flow materialized by the above control flow is as shown in FIG. 7, for example.

The first control logic 33 selects a set of data from among the plurality of sets of first control data DT(FMode1_0) to DT(FMode1_$n$), and the plurality of sets of second control data DT(FMode2_0) to DT(FMode2_$m$) for each display frame period according to the display mode set on the mode register 36 and the count value of the frame counter 30. It is assumed that m=2 and n=2 to fit the examples shown in FIGS. 8 and 9 for easier understanding and the frame counter 30 counts internal frame synchronizing signals IVSYNC from its initial value 0 to 2 according to the wrap around manner. In this case, in the first display mode DMode1, the first control logic 33 selects the control data DT(FMode1_0) of the first frame mode FMode1 when FCOUNT=0, selects the control data DT(FMode1_1) of the first frame mode FMode1 when FCOUNT=1, and selects the control data DT(FMode1_2) of the first frame mode FMode1 when FCOUNT=2. The select form corresponds to that shown in FIG. 9. In the second display mode DMode2, the first control logic 33 selects the control data DT(FMode2_0) of the second frame mode FMode2 when FCOUNT=0, selects the control data DT(FMode2_1) of the second frame mode FMode2 when FCOUNT=1, and selects the control data DT(FMode1_2) of the first frame mode FMode1 when FCOUNT=2. The select form corresponds to that shown in FIG. 8.

Figure 11:
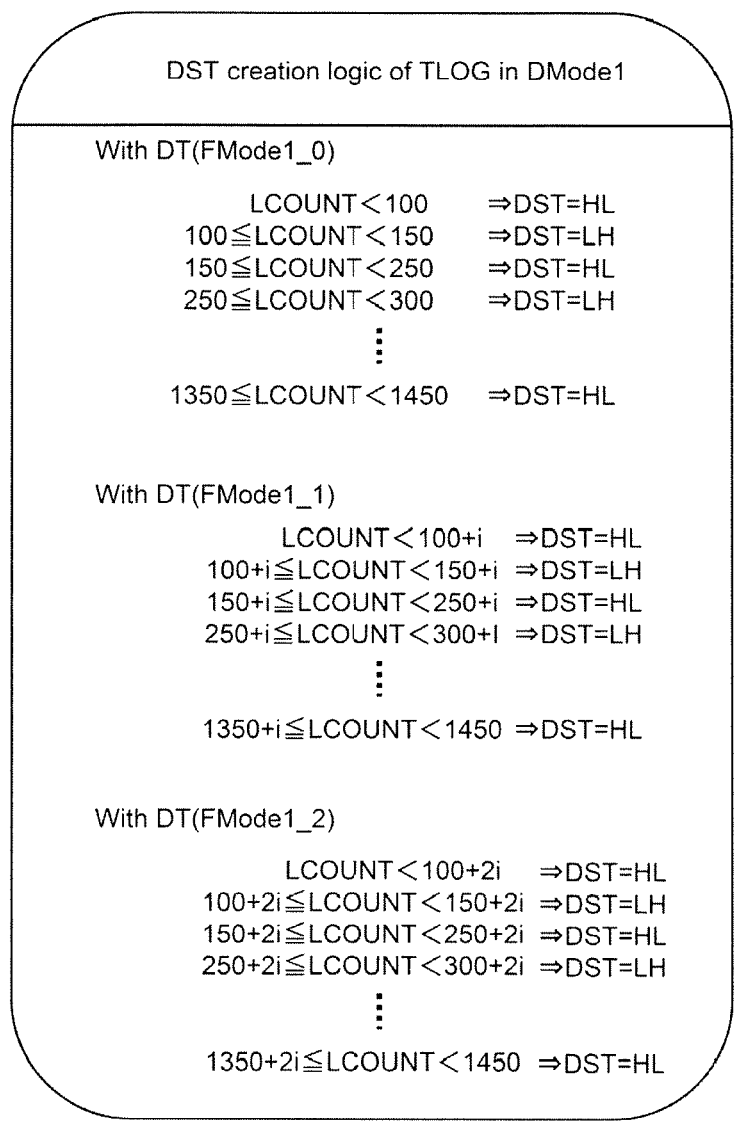
FIG. 11 is an explanatory diagram showing, by example, the logic of status signal creation by a second control logic in the first display mode.
Figure 12:
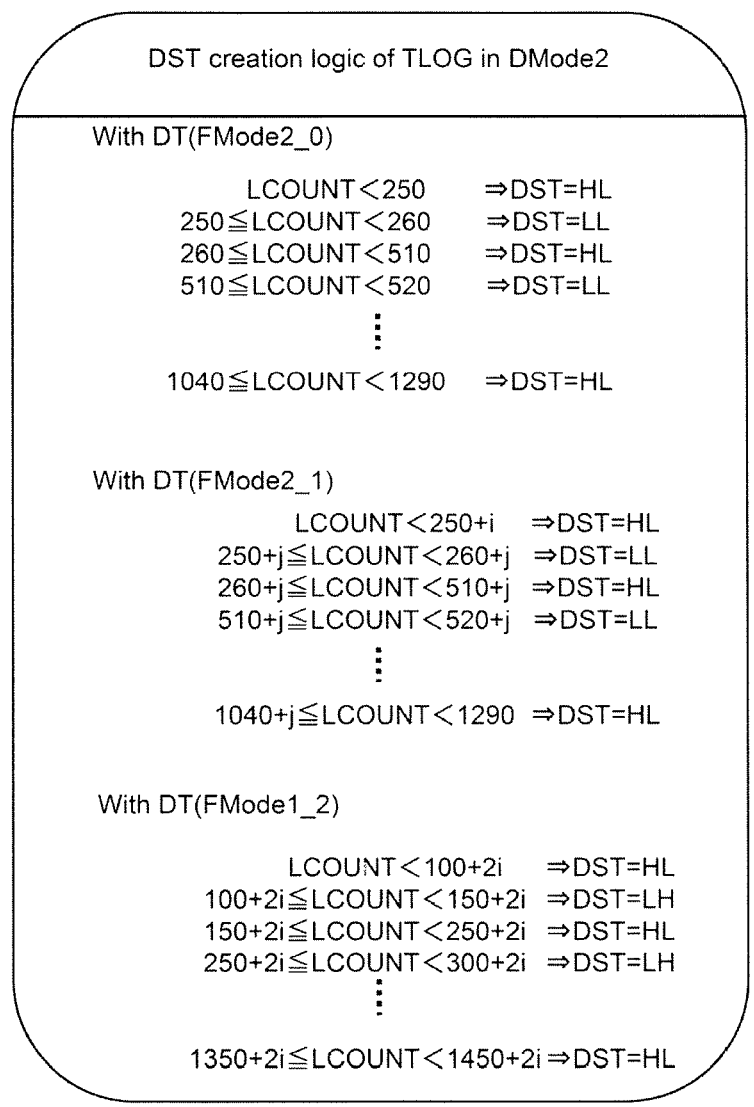
FIG. 12 is an explanatory diagram showing, by example, the logic of status signal creation by a second control logic in the second display mode.

The second control logic 34 produces status signals DST in turn according to the count value of the line counter 31 in each display frame period each time the count value reaches the respective start timings of the display terms DISP and non-display terms LHB in the display frame period, which are defined by the control data selected by the first control logic 33. The line counter 31 counts up internal horizontal synchronizing signals IHSYNC; its count value is reset by the internal frame synchronizing signal IVSYNC for each display frame period. The creation logic of the status signal DST created by the second control logic 34 with the control data selected in the first display mode DMode1 is as illustrated in FIG. 11. The creation logic of the status signal DST created by the control logic 34 with the control data selected in the second display mode DMode2 is as illustrated in FIG. 12, for example. Although no special restriction is intended, the status signal DST is a code d0d1 of 2 bits; "d0" directs the display action when taking H (e.g. a logical value "1"), and it makes a direction for suppressing the display action when taking L (e.g. a logical value 0); and "d1" directs the touch detection action when taking H, and it makes a direction for suppressing the touch detection action when taking L.

The creation logic illustrated in FIG. 11 is related to the form of FIG. 9, by which the display term DISP to perform the display action in, and the non-display term LHB to perform the touch detection action in are alternately generated in each display frame period FLM. In other words, in such a case that the touch operation is performed at a high frequency, the display action and the touch detection action are exclusively performed in each display frame period by the first display mode DMode1.

The creation logic illustrated in FIG. 12 is related to the form of FIG. 8. As to preceding two display periods of three display frame periods, a display term DISP to perform the display action in, and a non-display term LHB to suppress the touch detection action in are alternately generated in each display frame period FLM; in the least display frame period FLM, a display term DISP to perform the display action in and a non-display term LHB to perform the touch detection action in are alternately generated. In such a case that the touch operation is performed at a high frequency, the display action and the touch detection action are performed exclusively in each display frame period. In other words, in such a case that the touch operation is performed at a low frequency, the display action and the touch detection action are exclusively performed only in the last display frame period per a plurality of display frame periods according to the second display mode DMode2.

The third control logic 35 is supplied with a command CMD and a command parameter CDATA from the host device 5 together with status signals DST, and uses a result of decode of the command CMD and the command parameter CDATA to produce control signals CNT1, CNT2, CNT3, CNT4 and CNT5. The control signals CNT1, CNT2, CNT3, CNT4 and CNT5 are produced in synchronization with the internal frame synchronizing signal IVSYNC and the internal horizontal synchronizing signal IHSYNC according to their control functions. Particularly, in a term which is made the non-display term because of d0=L in the status signal DST, the display action is stopped by suspending the additional scan electrode driving by the scan line drive circuit 20, the signal electrode driving by the gradation drive circuit 21, and the additional display data latching by the line latch circuit 23, and the like. Further, the second control circuit 14 of the touch panel controller 6 supplied with the status signal DST performs the touch detection action on the touch frame in a term, which makes a non-display term, when d1=H in the status signal DST, and it suppresses the touch detection action on the touch frame in a term when d1=L. In the access control on the FIFO buffer 22, the write (push) and the read (pop) are performed so that the FIFO buffer 22 never becomes data empty during a display term DISP. The display data transfer rate from the host device 5 is slower than the display speed. So, in order to ensure that the FIFO buffer 22 never becomes data empty during the display term DISP, the display data write action is performed on the FIFO buffer 22 in the non-display term LHB, whereby the FIFO buffer is preferably put in its data-full state.

The first to third control logics 33, 34 and 35 may be each a hard wired logic, or a program processing circuit of which the logic action is decided by a software program such as a firmware. While the former is preferred from the viewpoint of high-speed processing, the latter is rather advantageous in light of the general versatility or flexible adaptability.

The display control and touch detection device 4 as described above has the effect and advantage as described below.

(1) The start timings of the display term DISP and the non-display term LHB are changed in units of the display frame period FLM, which makes possible to suppress the phenomenon of an undesired brightness difference appearing at a fixed location in a display frame FLM owing to no display, and the phenomenon of the undesired brightness difference causing flicker.

(2) Since data DT(FMode1_0) to DT(FMode1_$n$), which decide the start timings of display and non-display, and the way to use DT(FMode2_0) to DT(FMode2_$m$) are changed based on the result of touch detection as in the first display mode DMode1 and the second display mode DMode2, the action of starting the display term DISP and the non-display term LHB with the timing which conforms to a request from a system using the display control and touch detection device 4 is facilitated. For instance, in case that the display action is performed at a speed faster than the transfer rate of display data supplied from the host device with no frame buffer memory prepared, a non-display term is provided for accumulating display data to be displayed subsequently in the FIFO buffer even if the touch detection action is not performed and in addition, the power consumption may be reduced by lowering the frequency of the touch detection after the state of no touch detection continues for a fixed length of time. To meet these requirements, the means for changing the start timings of the display term DISP and the non-display term LHB in a display frame period FLM according to the result of touch detection is materialized readily.

(3) As described with reference to FIGS. 5 and 6, control data of the first frame mode FMode1, and control data of the second frame mode FMode2 are used to perform control to gradually increase the first display term by a predetermined length of time and shorten the last display term by the predetermined length of time in each display frame period FLM. Therefore, the control for changing the display term DISP and the non-display term LHB in start timing for each display frame period FLM is facilitated.

(4) By using the first frame mode FMode1 arranged to allow the display action in each display term DISP, and to allow the touch detection action in each non-display term LHB, noise produced by one of the touch detection action and the display action may be prevented from affecting the other action.

(5) By using control data of the second frame mode FMode2 arranged to allow the display action in each display term DISP and not to allow the touch detection action, the display terms are never formed uninterruptedly in a display frame period FLM in such a case that the touch detection is not required. So, in case that the display action is performed at a speed faster than a transfer rate of display data supplied from the host device 5, a non-display term can be used to perform the action of accumulating, in the FIFO buffer 22, display data to be displayed subsequently even if the touch detection action is not performed, which can eliminate the risk that the FIFO buffer 22 is made data empty in the middle of the display term.

(6) The following are adopted: the nonvolatile memory 32 which rewritably holds a plurality of sets of first control data DT(FMode1_0) to DT(FMode1_n) corresponding to the first frame mode FMode1 and a plurality of sets of second control data DT(FMode2_0) to DT(FMode2_m) corresponding to the second frame mode FMode2; and the control logics 33, 34, 35 which select a set of control data from among a plurality of sets of first control data and a plurality of sets of second control data according to the designation of the display mode DMode1 or DMode2 from the microprocessor 7 in each display frame period, and which produce control signals for display terms DISP and non-display terms LHB in the display frame period FLM based on the selected set of control data. Therefore, the start timings of display and non-display terms in a display frame period can be variously controlled according to the contents of first and second control data sets stored in the nonvolatile memory 32 and further, a control data select form depending on a mode designation from the microprocessor 7. In short, the start timings of display and non-display terms in a display frame period can be programmably controlled readily.

(7) In the first display mode DMode1, display and touch detection are performed exclusively in a display frame period FLM. Therefore, the noise caused by one of a touch detection action and a display action can be prevented from affecting the other action by the first frame mode FMode1. In addition, the second display mode DMode2 in which the touch detection in a display frame period FLM is not required contributes to a low power consumption because of the second frame mode FMode2 which lowers the frequency of the touch detection. Further, even if the touch detection action is not performed, a non-display term is ensured, thereby avoiding forming display terms uninterruptedly. So, the action of writing display data into the FIFO buffer 22 in a non-display term LHB can be performed, and it can be assured that the FIFO buffer 22 is never made data empty in a display term DISP even if the transfer rate of display data from the host device 5 is slower than the display speed.

(8) The first control logic 33 and the second control logic 34 are included in the program processing circuit. So, of the sets of first control data DT(FMode1_0) to DT(FMode1_n) and the sets of second control data DT(FMode2_0) to DT(FMode2_m), which set of control data to use can be decided by program data programmably, and the degree of freedom of display control or touch detection control can be increased.

(9) Use of the FIFO buffer 22 smaller than the data size of a display frame enables the contribution to the downsizing of a display and touch control device unlike an embodiment arranged so that a frame buffer is included.

While the invention made by the inventor has been concretely described on the embodiments above, the invention is not limited to the embodiments. It is obvious that various changes or modifications thereof may be made without departing subject matter thereof.

The way to shift the start timings of the display and non-display terms in the first frame mode FMode1 and the second frame mode FMode2 is not limited to the method for defining the individual terms by the clock number of horizontal synchronization clocks as illustrated in FIGS. 5 and 6. The start timing of each term can be changed appropriately by defining it by the time or the value of counted clocks, or defined by a mathematical formula.

In addition, the control logics of the display control part are not limited to the logics as described with reference to FIGS. 1, 11, 12, etc., which may be changed appropriately. As illustrated in FIG. 4, the first and second frame modes are different from each other in the total number of display terms DISP and non-display terms LHB in one display frame period FLM. The difference is absorbed by the length of a combination of the front porch FRNTP and blank period BLNK, and the first and second frame modes are made identical in the term of the back porch BCKP to facilitate the control, and vice versa. The values of "i" and "j" in FIGS. 5 and 6 may be decided appropriately. The values of "n" and "m" are not limited to 2, which may be decided appropriately. As a matter of course, the count-up value of the frame counter 30 is set variably.

The display panel to be driven may be an electroluminescence panel or the like. The structure of a display panel to be driven by the device according to the invention is not limited to that shown in FIG. 3. A touch detection and display control device may be configured by mounting, on a circuit board, the touch controller 6, the microprocessor 7 and the display controller 8, which are arranged in different semiconductor chips respectively. The invention is widely applicable to not only portable information terminal devices such as a tablet and a smart phone, but also other information terminal devices.

What is claimed is:

1. A control device comprising:
   a display controller configured to:
      update a display panel during a plurality of display terms of a first display frame period of a plurality of display frame periods, wherein the first display frame period comprises a plurality of non-display terms, and wherein at least one of the plurality of non-display terms is arranged between two of the plurality of the display terms; and
      control the plurality of display terms and the plurality of non-display terms based on control signals; and
   control logic configured to:
      select, based on a mode designation for the first display frame period, control data from among control data of a first frame mode and control data of a second frame mode;
      generate a first at least one control signal of the control signals for each of the plurality of display terms and each of the plurality of non-display terms based on the selected control data;
      count a number of display line clocks for the first display frame period; and
      generate a second at least one control signal of the control signals in response to the counted number of the display line clocks, wherein the second at least one control signal corresponds to a start timing of a first display term of the plurality of display terms or a first non-display term of the plurality of non-display terms.

2. The control device of claim 1, further comprising:
   a touch controller configured to perform touch detection on a touch panel during the plurality of non-display terms, wherein the plurality of display terms and the plurality of non-display terms are adjusted based on a result of the touch detection.

3. The control device of claim 2, wherein in the first frame mode, the display panel is updated during the plurality of display terms and touch detection is performed in the plurality of non-display terms, and
   wherein in the second frame mode, the display panel is updated during the plurality of display terms and touch detection is suppressed in the plurality of non-display terms.

4. The control device of claim 2, wherein:
   the plurality of display terms and the plurality of non-display terms are controlled corresponding to a first display mode after a reset process, wherein in the first display mode, the second frame mode is executed in a first one or more of the plurality of display frame periods, and the first frame mode is executed in a second one or more of the plurality of display frame periods;
   the plurality of display terms and the plurality of non-display terms are controlled corresponding to a second display mode in response to a detection of touch, wherein in the second display mode, the first frame mode is executed during a third one or more of the plurality of display frame periods; and
   the plurality of display terms and the plurality of non-display terms are controlled corresponding to the first display mode in response to a lack of touch detection.

5. The control device of claim 1, wherein the control logic is further configured to:
   generate the second at least one control signal in response to the counted number of the display line clocks corresponding to the start timing of the first display term; and
   generate a third at least one control signal of the control signals in response to the counted number of the display line clocks corresponding to the start timing of the first non-display term.

6. The control device of claim 1, wherein:
   the control data of the first frame mode comprises a plurality of sets of first control data, each of the plurality of sets of first control data defines start timings of the plurality of display terms and the plurality of non-display terms for a corresponding display frame period of the plurality of display frame periods; and
   the control data of the second frame mode comprises a plurality of sets of second control data, each of the plurality of sets of second control data defines the start timings of the plurality of display terms and the plurality of non-display terms for a corresponding display frame period of the plurality of display frame periods.

7. The control device of claim 1, wherein the control logic is further configured to:
   increase a length of a second display term of the plurality of display terms by a first amount; and
   decrease a length of a third display term of the plurality of display terms by a second amount.

8. The control device of claim 7, wherein the first amount is equal to the second amount.

9. A device comprising:
   a display panel;
   an integrated circuit coupled to the display panel and comprising:
      a display controller configured to:
         update the display panel during a plurality of display terms of a first display frame period of a plurality of display frame periods, wherein the first display frame period comprises a plurality of non-display terms, and wherein at least one of the plurality of non-display terms is arranged between two of the plurality of the display terms; and
         control the plurality of display terms and the plurality of non-display terms based on control signals; and
      control logic configured to:
         select, based on a mode designation for the first display frame period, control data from among control data of a first frame mode and control data of a second frame mode;
         generate a first at least one control signal of the control signals for each of the plurality of display terms and each of the plurality of non-display terms based on the selected control data;
         count a number of display line clocks for the first display frame period; and
         generate a second at least one control signal of the control signals in response to the counted number of the display line clocks, wherein the second at least one control signal corresponds to a start timing of a first display term of the plurality of display terms or a first non-display term of the plurality of non-display terms.

10. The device of claim 9, further comprising a touch panel, and wherein the integrated circuit further comprises:
    a touch controller configured to perform touch detection on the touch panel during the plurality of non-display terms, wherein the plurality of display terms and the plurality of non-display terms are adjusted based on a result of the touch detection.

11. The device of claim 10, wherein:
the plurality of display terms and the plurality of non-display terms are controlled corresponding to a first display mode after a reset process, wherein in the first display mode, the second frame mode is executed in a first one or more of the plurality of display frame periods, and the first frame mode is executed in a second one or more of the plurality of display frame periods;
the plurality of display terms and the plurality of non-display terms are controlled corresponding to a second display mode in response to a detection of touch, wherein in the second display mode, the first frame mode is executed during a third one or more of the plurality of display frame periods; and
the plurality of display terms and the plurality of non-display terms are controlled corresponding to the first display mode in response to a lack of touch detection.

12. The device of claim 9, wherein the control logic is further configured to:
generate the second at least one control signal in response to the counted number of the display line clocks corresponding to the start timing of the first display term; and
generate a third at least one control signal of the control signals in response to the counted number of the display line clocks corresponding to the start timing of the first non-display term.

13. The device of claim 9, wherein:
the control data of the first frame mode comprises a plurality of sets of first control data, each of the plurality of sets of first control data defines start timings of the plurality of display terms and the plurality of non-display terms for a corresponding display frame period of the plurality of display frame periods; and
the control data of the second frame mode comprises a plurality of sets of second control data, each of the plurality of sets of second control data defines the start timings of the plurality of display terms and the plurality of non-display terms for a corresponding display frame period of the plurality of display frame periods.

14. The device of claim 9, wherein the control logic is further configured to:
increase a length of a second display term of the plurality of display terms by a first amount; and
decrease a length of a third display term of the plurality of display terms by a second amount.

15. The device of claim 14, wherein the first amount is equal to the second amount.

16. A method for operating a device comprising a display panel, the method comprising:
updating the display panel during a plurality of display terms of a first display frame period of a plurality of display frame periods, wherein the first display frame period comprises a plurality of non-display terms, and wherein at least one of the plurality of non-display terms is arranged between two of the plurality of the display terms;
selecting, based on a mode designation for the first display frame period, control data from among control data of a first frame mode and control data of a second frame mode;
controlling the plurality of display terms and the plurality of non-display terms based on the selected control data; and
controlling the plurality of display terms and the plurality of non-display terms corresponding to a first display mode after a reset process,
wherein in the first display mode, the second frame mode is executed in a first one or more of the plurality of display frame periods, and the first frame mode is executed in a second one or more of the plurality of display frame periods.

17. The method of claim 16 further comprising:
performing touch detection on a touch panel during the plurality of non-display terms; and
adjusting at least one of the plurality of display terms and the plurality of non-display terms based on a result of the touch detection.

18. The method of claim 17, further comprising:
counting a number of display line clocks for the first display frame period;
initiating display updating in response to the count of the number of the display line clocks corresponding to a start timing of one or more of the plurality of display terms; and
initiating touch detection in response to the count of the number of the display line clocks corresponding to a start timing of one or more of the plurality of non-display terms.

19. The method of claim 16 further comprising:
controlling the plurality of display terms and the plurality of non-display terms corresponding to a second display mode in response to a detection of touch, wherein in the second display mode, the first frame mode is executed during a third one or more of the plurality of display frame periods; and
controlling the plurality of display terms and the plurality of non-display terms corresponding to the first display mode in response to a lack of touch detection.

20. The method of claim 16, wherein:
the control data of the first frame mode comprises a plurality of sets of first control data, each of the plurality of sets of first control data defines start timings of the plurality of display terms and the plurality of non-display terms for a corresponding display frame period of the plurality of display frame periods; and
the control data of the second frame mode comprises a plurality of sets of second control data, each of the plurality of sets of second control data defines the start timings of the plurality of display terms and the plurality of non-display terms for a corresponding display frame period of the plurality of display frame periods.

* * * * *